W. R. Cummings.
Combined Harrow and Cultivator.
Nº 91,917.   Patented Jun. 29, 1869.
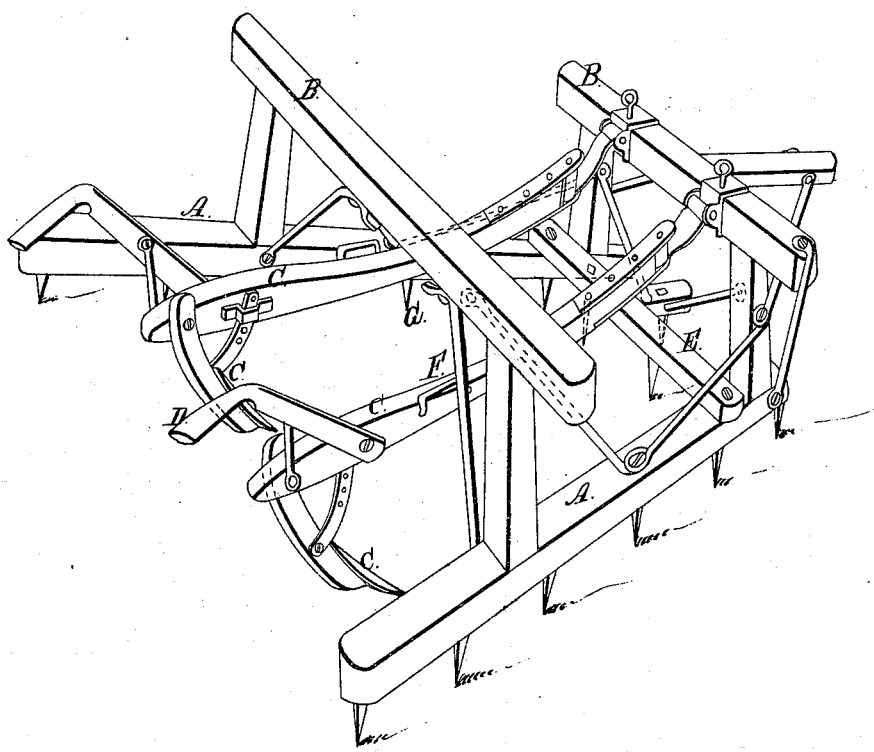

United States Patent Office.

W. R. CUMMINGS, OF McCUTCHANVILLE, INDIANA.

Letters Patent No. 91,917, dated June 29, 1869.

IMPROVEMENT IN HARROW AND CULTIVATOR COMBINED.

The Schedule referred to in these Letters Patent and making part of the same.

*To all whom it may concern:*

Be it known that I, W. R. CUMMINGS, of McCutchanville, in the county of Vanderburg, and State of Indiana, have invented a new and improved Harrow and Cultivator; and I do hereby declare that the following is a full, clear, and exact description thereof, which will enable others skilled in the art to make and use the same, reference being had to the accompanying drawings, forming part of this specification.

This invention relates to improvements in apparatus for harrowing and cultivating corn, cotton, &c., planted in rows, whereby it is designed to provide a machine adapted for harrowing and cultivating at the same time, on each side of a row, and which may also be readily adjusted for operation as a harrow alone.

The drawing represents a perspective view of my improved machine.

I connect the two beams A of a triangular harrow by the beams B, elevated upon posts, and so arranged that the front ends of the beams A shall be sufficiently far apart to pass along each side of a row of corn, cotton, or other substance, without injuring it, to permit the harrow to work on each side thereof.

From the front beam B, I suspend two cultivators, C, each independent of the other, and provided with handles, D, and also arranged to work on each side of the row.

This arrangement provides an apparatus capable of harrowing and cultivating simultaneously, and on both sides of a row, to be operated preferably by two horses, and adapted for great efficiency.

I have also arranged it so as to be employed as a harrow only, by the application of a transverse beam E, having teeth to act in the space between the front ends of the beams A, and by arranging the beams of the harrows to be suspended above the ground from the rear beam B, by means of the staples F, on the said beams, and the hooks G on the beam B.

Having thus described my invention,

I claim as new, and desire to secure by Letters Patent—

1. The combination, with the harrow-beams A, united by the elevated beams B, of the cultivators C, all arranged substantially as specified.

2. The arrangement of the beams A and E, as specified.

W. R. CUMMINGS.

Witnesses:
R. P. HOOKER,
JOB STAFFORD.